Patented Dec. 11, 1945

2,390,766

UNITED STATES PATENT OFFICE 2,390,766

COMPOSITION OF MATTER

Glenn F. Zellhoefer, Normal, and Carl S. Marvel, Urbana, Ill., and Michael J. Copley, Philadelphia, Pa., assignors, by mesne assignments, to Eureka Vacuum Cleaner Company, Detroit, Mich., a corporation of Michigan No Drawing. Original application May 10, 1940, Serial No. 334,346. Divided and this application February 23, 1942, Serial No. 432,032

1 Claim. (Cl. 260—583)

This invention relates to a new composition of matter and more particularly to a derivative of a polyethylene polyamine.

This application is carved out of and is a division of our co-pending application Serial No. 334,346, filed May 10, 1940, now Patent No. 2,308,665 issued January 19, 1943.

The polyethylene polyamine derivatives of this invention have the following structural formula

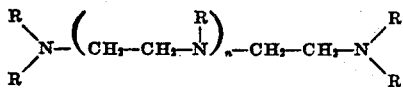

wherein at least one of said R's is an alkyl group and the remainder of said R's are selected from the group consisting of hydrogen, alkyl and acyl, and wherein $n$ is a small whole number.

A composition of this invention may be prepared by alkylating a polyethylene polyamine such as triethylene tetramine. If desired the alkylated product may be acetylated by any of the well known methods. Specific examples of the composition of matter of this invention are methylated triethylene tetramine, trimethyl triethylene tetramine and triacetyl trimethyl triethylene tetramine. It will be apparent to one skilled in the art that alkyl groups other than the methyl group may be substituted for one or more of the hydrogen atoms bonded to the nitrogen in the several amine groups. Likewise acyl groups other than the acetyl group may be substituted for other hydrogen atoms bonded to the nitrogen in the several amine groups. While this invention is hereinafter described with particular reference to derivatives of triethylene tetramine, the derivatives of other polyethylene polyamines are included within the scope thereof, such amines being derivatives of tetraethylene pentamine, pentaethylene hexamine, and the like.

As examples of methods for preparing the new compounds of this invention, the following are given:

Example 1

Triethylene tetramine was methylated using the method of Clarke, Gillespie and Weishaus (Clarke, Gillespie and Weishaus, J. Am. Chem. Soc., 55, 4571 [1933]). One and one-half kilograms of 90 per cent formic acid (30 moles) was added slowly to 500 g. of triethylene tetramine (3.4 moles). Considerable heat was evolved. To this red solution 800 cc. of 40 per cent formaldehyde (12 moles) was added, the mixture refluxed on a steam bath until the evolution of carbon dioxide ceased (about twenty-four hours). One liter of concentrated hydrochloric acid was added and the mixture evaporated to dryness in vacuo on a steam bath. The residue of amine hydrochloride was refluxed with concentrated sodium hydroxide solution (1 kg./l.) and the amine layer separated. One kilogram of solid sodium hydroxide was added, the mixture refluxed for five hours and the liquid layers decanted from the sodium chloride which was precipitated from solution. The amine layer was separated and treatment with solid sodium hydroxide repeated several times as above until all the water was removed as indicated by presence of one liquid layer over hot alkali. The amine was then dried by heating over sodium chips for ten hours and then purified by vacuum distillation to give 500 g. of a clear, nonviscous liquid, B. P. 99–103° C. at 2 mm.

Anal.—Calcd. for $C_{10}H_{26}N_4$ (tetramethyl): N, 27.7. Calcd. for $C_{11}H_{28}N_4$ (pentamethyl): N, 25.9. Found: N, 26.3. Hence the amine has an average of about 4.7 methyl groups per molecule.

Example 2

Five hundred grams of triethylene tetramine (3.4 moles) was diluted with 200 cc. of water and the solution surrounded by an ice bath. Then 600 g. of dimethyl sulfate (4.8 moles) was added dropwise while the cold (15–18° C.) solution was stirred vigorously with a mechanical stirrer. This addition required six hours. After all the dimethyl sulfate had been added the mixture was allowed to warm to room temperature (28° C.) and remain thus with stirring overnight. The tan reaction mixture was poured into a solution of 500 g. of sodium hydroxide dissolved in 1 l. of water and refluxed for ten hours on a steam bath to decompose the addition complex. The liquid layers were decanted from the sodium sulfate which had precipitated and the amine layer separated from the sodium hydroxide layer. The amine was refluxed with solid sodium hydroxide to remove water. This process was repeated until no separation into liquid layers occurred on refluxing the amine with solid sodium hydroxide. The amine was dried by heating overnight with sodium chips, and then purified by vacuum distillation to give 400 g. of slightly yellow, nonviscous liquid, B. P. 97–107° C. at 2–3 mm.

Anal.—Calcd. for $C_9H_{24}N_4$ (trimethyl): C, 57.5; H, 12.8; N, 29.8. Found: C, 57.9; H, 12.6; N, 29.6.

Example 3

To 57 g. of trimethyl triethylene tetramine in an all glass refluxing flask and condenser an excess (200 cc.) of acetic anhydride was added slowly. A vigorous reaction occurred immediately with the formation of a dark brown solution and evolution of much heat. The mixture was refluxed overnight. The acetic anhydride was distilled from the reaction mixture leaving a dark brown tar. The tar was distilled in vacuo with slight decomposition to give 80 g. of an extremely viscous brown liquid with a green fluorescence, B. P. 200–225° C. at 2–4 mm. This amide is water soluble and alcohol soluble. Treatment of the water solution with Norite did not result in decolorizing the amide.

*Anal.*—Calcd. for $C_{15}H_{30}O_3N_4$ (trimethyl triacetyl): N, 17.8. Found: N, 17.6.

In the foregoing we have disclosed processes of preparing several of the specific compounds contemplated by us in accordance with this invention. However, as previously indicated, other analogous compounds may be prepared by similar methods such compounds having the general structural formula indicated above, and in accordance with this invention we contemplate those compounds having the structural formula there indicated.

Compounds of the type contemplated by this invention have a normal boiling point at atmospheric pressures above about 364° F. In accordance with the disclosure in our above referred to parent application, the substituted polyamines of this invention are particularly useful as an absorbent for a refrigerant selected from the group consisting of water and alcohols whereby to produce a working fluid for an absorption refrigerating system. Other uses of the new compounds contemplated by this invention will be apparent to one skilled in the art.

While several particular embodiments of this invention are shown above, it will be understood, of course, that the invention is not to be limited thereto, since many modifications may be made, and it is contemplated, therefore, by the appended claim, to cover any such modifications as fall within the true spirit and scope of this invention.

We claim:

An N-methylated triethylenetetramine resulting from the interaction of 3.4 moles of triethylenetetramine, 30 moles of formic acid, and 12 moles of formaldehyde, said product averaging 4.7 methyl groups per molecule, and consisting substantially of a mixture of tetramethyl and pentamethyl triethylenetetramines.

GLENN F. ZELLHOEFER.
CARL S. MARVEL.
MICHAEL J. COPLEY.